US012675329B2

(12) United States Patent
Singh

(10) Patent No.: US 12,675,329 B2
(45) Date of Patent: Jul. 7, 2026

(54) TASK ALLOCATION IN A CLOUD ENVIRONMENT

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 534 days.

(21) Appl. No.: 17/514,051

(22) Filed: Oct. 29, 2021

(65) Prior Publication Data

US 2023/0138568 A1 May 4, 2023

(51) Int. Cl.
*G06F 9/50* (2006.01)
*H04L 67/10* (2022.01)

(52) U.S. Cl.
CPC ............ *G06F 9/5038* (2013.01); *H04L 67/10* (2013.01)

(58) Field of Classification Search
CPC ..... G06F 9/5038; G06F 9/4881; H04L 67/10; H04L 67/1012
USPC ........................................................ 718/104
See application file for complete search history.

(56) References Cited

U.S. PATENT DOCUMENTS

| | | | | |
|---|---|---|---|---|
| 7,743,378 B1 * | 6/2010 | Markov | ................. | G06F 9/5055 718/103 |
| 8,140,775 B1 * | 3/2012 | Chatterjee | ........... | G06F 11/3433 711/170 |
| 10,069,680 B1 * | 9/2018 | Wylie | ...................... | H04L 41/40 |
| 10,078,520 B1 * | 9/2018 | Chirayath Kuttan | ......................... | G06F 9/3856 |

| | | | | |
|---|---|---|---|---|
| 11,150,995 B1 * | 10/2021 | Dhoolam | ............ | G06F 16/9535 |
| 2004/0021678 A1 * | 2/2004 | Ullah | ...................... | G06F 9/5027 715/700 |
| 2008/0115143 A1 * | 5/2008 | Shimizu | ................ | G06F 9/5066 718/105 |
| 2009/0282413 A1 * | 11/2009 | Cialini | ................... | G06F 9/4881 718/102 |
| 2011/0320233 A1 * | 12/2011 | Arnette | ................... | H04L 47/70 705/7.15 |
| 2012/0203888 A1 * | 8/2012 | Balakrishnan | ......... | G06F 9/505 709/224 |
| 2014/0229221 A1 * | 8/2014 | Shih | ................. | G06Q 10/06312 705/7.23 |
| 2016/0019094 A1 * | 1/2016 | Habdank | .............. | G06F 9/5061 718/104 |
| 2016/0098292 A1 * | 4/2016 | Boutin | .................. | G06F 9/4881 718/104 |
| 2016/0103705 A1 * | 4/2016 | Wang | .................... | G06F 9/5061 718/104 |
| 2017/0220610 A1 * | 8/2017 | Laethem | ............. | G06F 16/9577 |
| 2018/0060402 A1 * | 3/2018 | Fabjanski | ............ | G06F 16/254 |

(Continued)

*Primary Examiner* — Adam Lee

(57) ABSTRACT

In one aspect, an example methodology implementing the disclosed techniques includes, by a computing device, determining an average time to finish for a first task to be executed and determining whether there is a resource instance that is designated to service tasks whose average time to finish matches the average time to finish for the first task. The method also includes, responsive to a determination that there is a resource instance that is designated to service tasks whose average time to finish matches the average time to finish for the first task, determining whether the resource instance has available capacity to service the first task. The method further includes, responsive to a determination that the resource instance has available capacity to service the first task, assigning the first task to the resource instance.

20 Claims, 10 Drawing Sheets

(56)         References Cited

U.S. PATENT DOCUMENTS

| | | | | |
|---|---|---|---|---|
| 2018/0103088 | A1* | 4/2018 | Blainey | H04L 67/1008 |
| 2018/0260746 | A1* | 9/2018 | Xiong | G06F 40/40 |
| 2018/0270165 | A1* | 9/2018 | Chen | G06F 9/4881 |
| 2018/0343299 | A1* | 11/2018 | Egashira | G06F 16/27 |
| 2018/0349183 | A1* | 12/2018 | Popovic | H04L 41/0806 |
| 2019/0303197 | A1* | 10/2019 | Li | G06F 9/4887 |
| 2019/0386889 | A1* | 12/2019 | Noorshams | H04L 67/10 |
| 2020/0177629 | A1* | 6/2020 | Hooda | H04L 47/125 |
| 2020/0310413 | A1* | 10/2020 | Zhao | H04L 67/12 |
| 2021/0125329 | A1* | 4/2021 | Zachmann | G06N 5/04 |
| 2021/0326221 | A1* | 10/2021 | Guim Bernat | G06F 11/0709 |
| 2022/0027744 | A1* | 1/2022 | Krishnan | G06N 5/02 |

* cited by examiner

TASK ALLOCATION IN A CLOUD ENVIRONMENT

BACKGROUND

Cloud computing architectures enable ubiquitous, convenient, on-demand network access to a shared pool of configurable computing resources that can be rapidly provisioned and released with minimal management effort or cloud service provider interaction. Adoption of cloud computing has been aided by the recent advances in virtualization technologies, which allows for the creation of virtual versions of something, e.g., a computing resource. Cloud computing models allow many different organizations (or "customers") to manage the provisioning of computing resources (e.g., virtualized resources) as well as the allocation of the computing resources to end users.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

As noted above, a cloud computing architecture, such as a cloud computing environment, is a model for service delivery that provides users on-demand network access to a shared pool of computing resources (e.g., virtual machines, micro virtual machines, containers, serverless functions, processing, memory, networks, etc.) that can be rapidly provisioned and released. Cloud computing implementations are generally expected to support large numbers of concurrent operations (e.g., tasks) as well as provide good user experience and low latency in a cost-effective manner. To accomplish this, cloud computing implementations may provide auto scaling of resources to trigger and service incoming tasks (e.g., incoming unit of work for a compute resource) in a time efficient manner. With auto scaling, resources are scaled up or scaled down (i.e., resource instances are automatically provisioned or shut down) based on incoming tasks or other criteria. For example, when a task is received, the task is assigned to the first resource instance that can service the task. If there are no resource instances that can service the task, a new resource instance is provisioned, and the task is assigned to the newly provisioned resource instance. This may result in resource fragmentation where the resource instances become fragmented over time as the tasks assigned to the individual resource instances finish executing (i.e., complete processing). Unfortunately, this fragmentation causes the resource instances to be inefficiently utilized and leads to performance degradation and increased costs. Embodiments of the present disclosure provide solutions to these and other technical problems described herein.

In accordance with one example embodiment provided to illustrate the broader concepts, systems, and techniques described herein, a method may include, by a computing device, determining an average time to finish for a first task to be executed and determining whether there is a resource instance that is designated to service tasks whose average time to finish matches the average time to finish for the first task. The method may also include, by the computing device, responsive to a determination that there is a resource instance that is designated to service tasks whose average time to finish matches the average time to finish for the first task, determining whether the resource instance has available capacity to service the first task. The method may further include, by the computing device, responsive to a determination that the resource instance has available capacity to service the first task, assigning the first task to the resource instance.

According to another illustrative embodiment provided to illustrate the broader concepts described herein, a system includes a memory and one or more processors in communication with the memory. The processor may be configured to determine an average time to finish for a first task to be executed and determine whether there is a resource instance that is designated to service tasks whose average time to finish matches the average time to finish for the first task. The processor may be also configured to, responsive to a determination that there is a resource instance that is designated to service tasks whose average time to finish matches the average time to finish for the first task, determine whether the resource instance has available capacity to service the first task. The processor may be further configured to, responsive to a determination that the resource instance has available capacity to service the first task, assign the first task to the resource instance.

According to another illustrative embodiment provided to illustrate the broader concepts described herein, a non-transitory computer-readable medium stores program instructions that may be executable to, by a computing device, determine an average time to finish for a first task to be executed and determine whether there is a resource instance that is designated to service tasks whose average time to finish matches the average time to finish for the first task. The program instructions may also be executable to, by the computing device, responsive to a determination that there is a resource instance that is designated to service tasks whose average time to finish matches the average time to finish for the first task, determine whether the resource instance has available capacity to service the first task. The program instructions may further be executable to, by the computing device, responsive to a determination that the resource instance has available capacity to service the first task, assign the first task to the resource instance.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
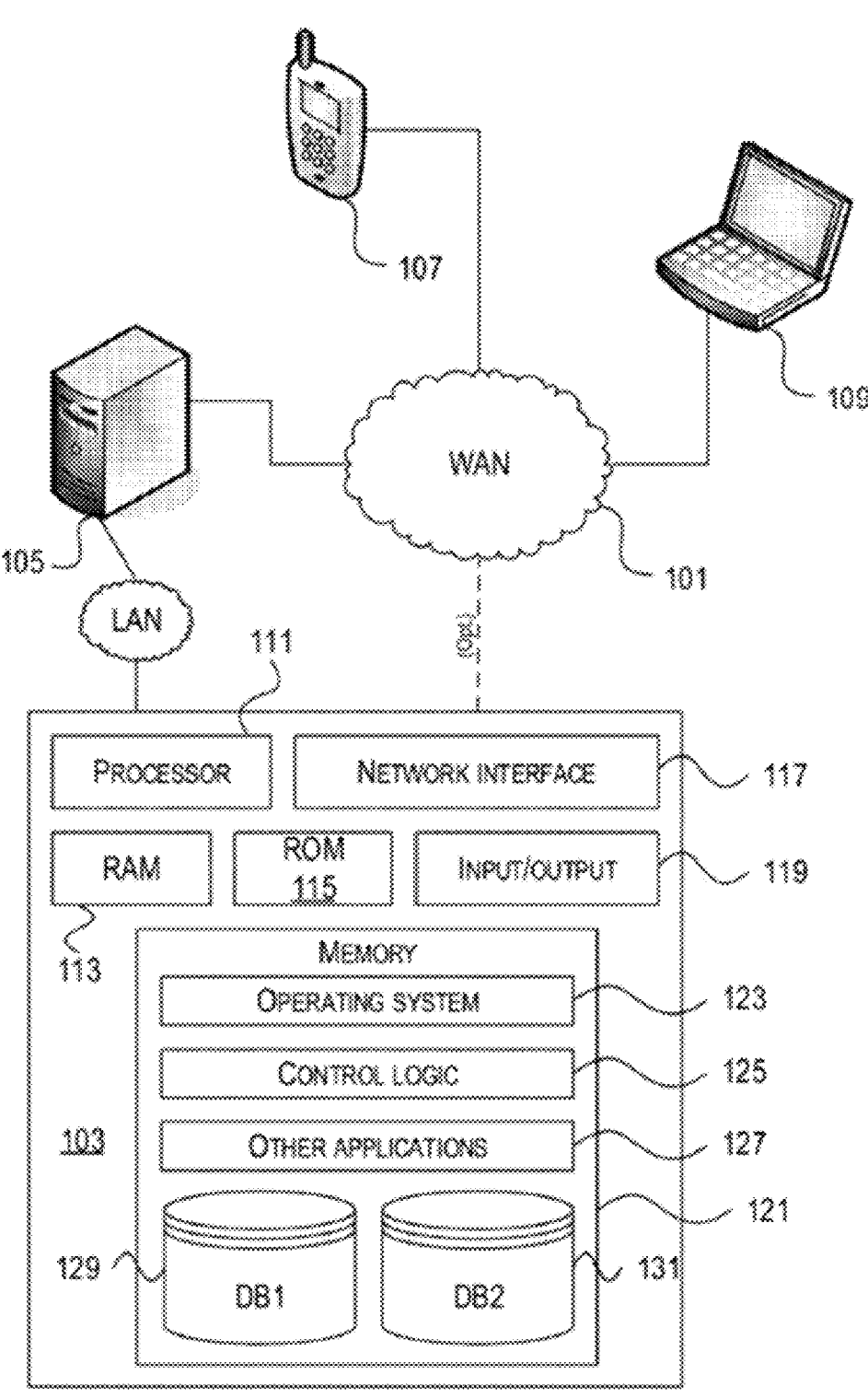
FIG. 1 depicts an illustrative computer system architecture that may be used in accordance with one or more illustrative aspects of the concepts described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include random access memory (RAM) 113, read only memory (ROM) 115, a network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. Control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
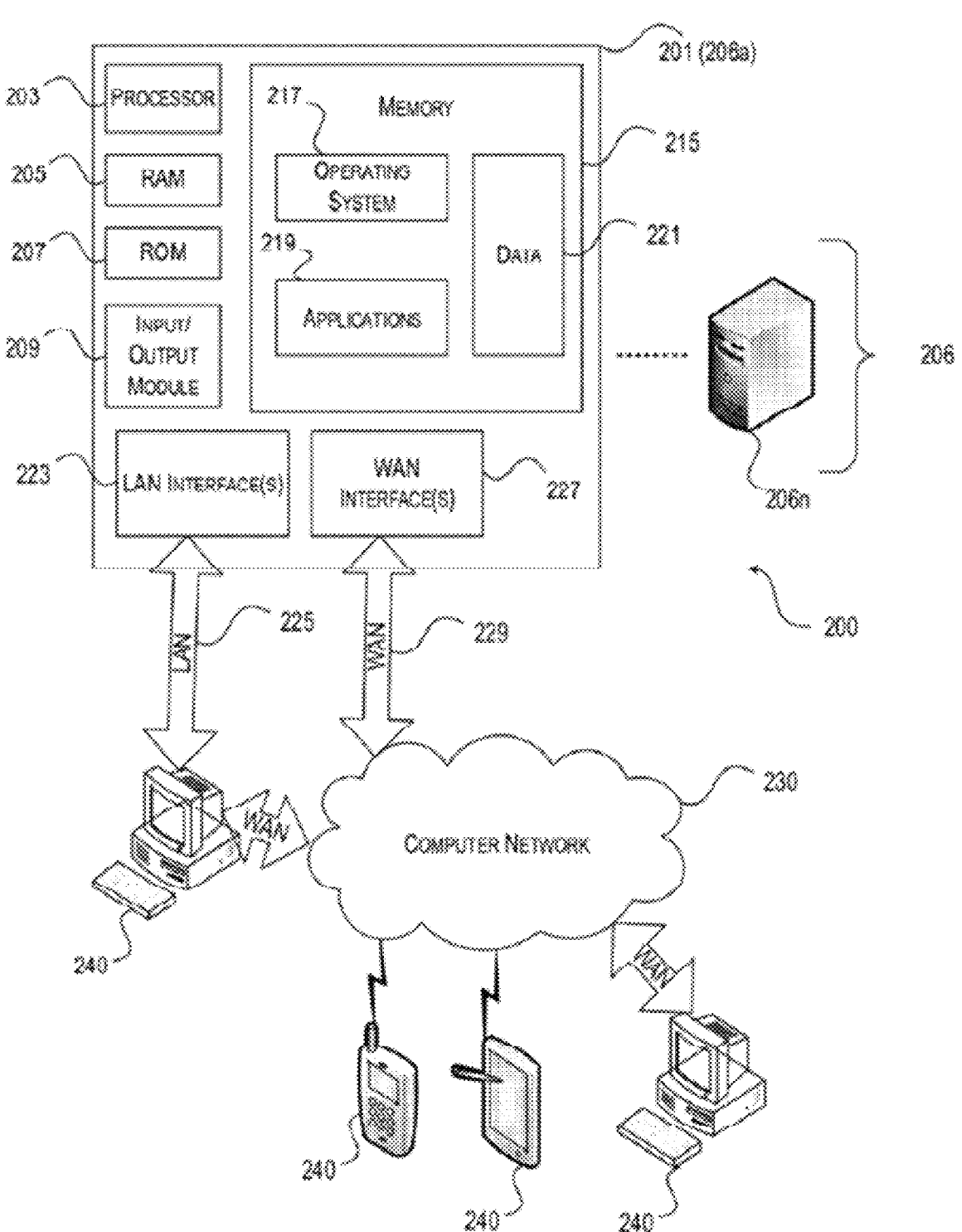
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide VMs for client access devices. Computing device 201 may have a processor 203 for controlling overall operation of the server and its associated components, including RAM 205, ROM 207, an input/output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by computing device 201, such as an operating system 217, application programs 219, and an associated database 221.

Computing device 201 may operate in a networked environment supporting connections to one or more remote computers, such as terminals 240 (also referred to as client devices). Terminals 240 may be personal computers, mobile devices, laptop computers, tablets, or servers that include many or all the elements described above with respect to data server 103 or computing device 201. The network connections depicted in FIG. 2 include a local area network (LAN) 225 and a wide area network (WAN) 229 but may also include other networks. When used in a LAN networking environment, computing device 201 may be connected to LAN 225 through an adapter or network interface 223.

When used in a WAN networking environment, computing device 201 may include a modem or other wide area network interface 227 for establishing communications over WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, computing environment 200 may include a network appliance installed between server(s) 206 and terminals 240. The network appliance may manage client/server connections, and in some cases can load balance client connections amongst a plurality of back-end servers 206.

Terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

Terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). Server 206, in some embodiments, may be referred to as any one of the following non-exhaustive terms: server(s), local machine; remote machine; server farm(s), or host computing device(s).

In one embodiment, terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on server 206 or a hypervisor executing on terminal 240.

Some embodiments include a terminal 240 that displays application output generated by an application remotely executing on server 206 or other remotely located machine. In these embodiments, terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Fort Lauderdale, Florida; or the Remote Desktop Protocol (RDP) manufactured by Microsoft Corporation of Redmond, Washington.

A remote computing environment may include more than one server 206a-206n logically grouped together into a server farm 206, for example, in a cloud computing environment. Server farm 206 may include servers 206a-206n that are geographically dispersed while logically grouped together, or servers 206a-206n that are located proximate to each other while logically grouped together. Geographically dispersed servers 206a-206n within server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, server farm 206 may be administered as a single entity, while in other embodiments server farm 206 can include multiple server farms.

In some embodiments, server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from terminal 240, forwards the request to a second server 206b (not shown), and responds to the request generated by terminal 240 with a response from second server 206b (not shown). First server 206a may acquire an enumeration of applications available to terminal 240 as well as address information associated with an application server 206 hosting an application identified within the enumeration of applications. First server 206a can present a response to the client's request using a web interface and communicate directly with terminal 240 to provide terminal 240 with access to an identified application. One or more terminals 240 and/or one or more servers 206 may transmit data over network 230, e.g., network 101.

Figure 3:
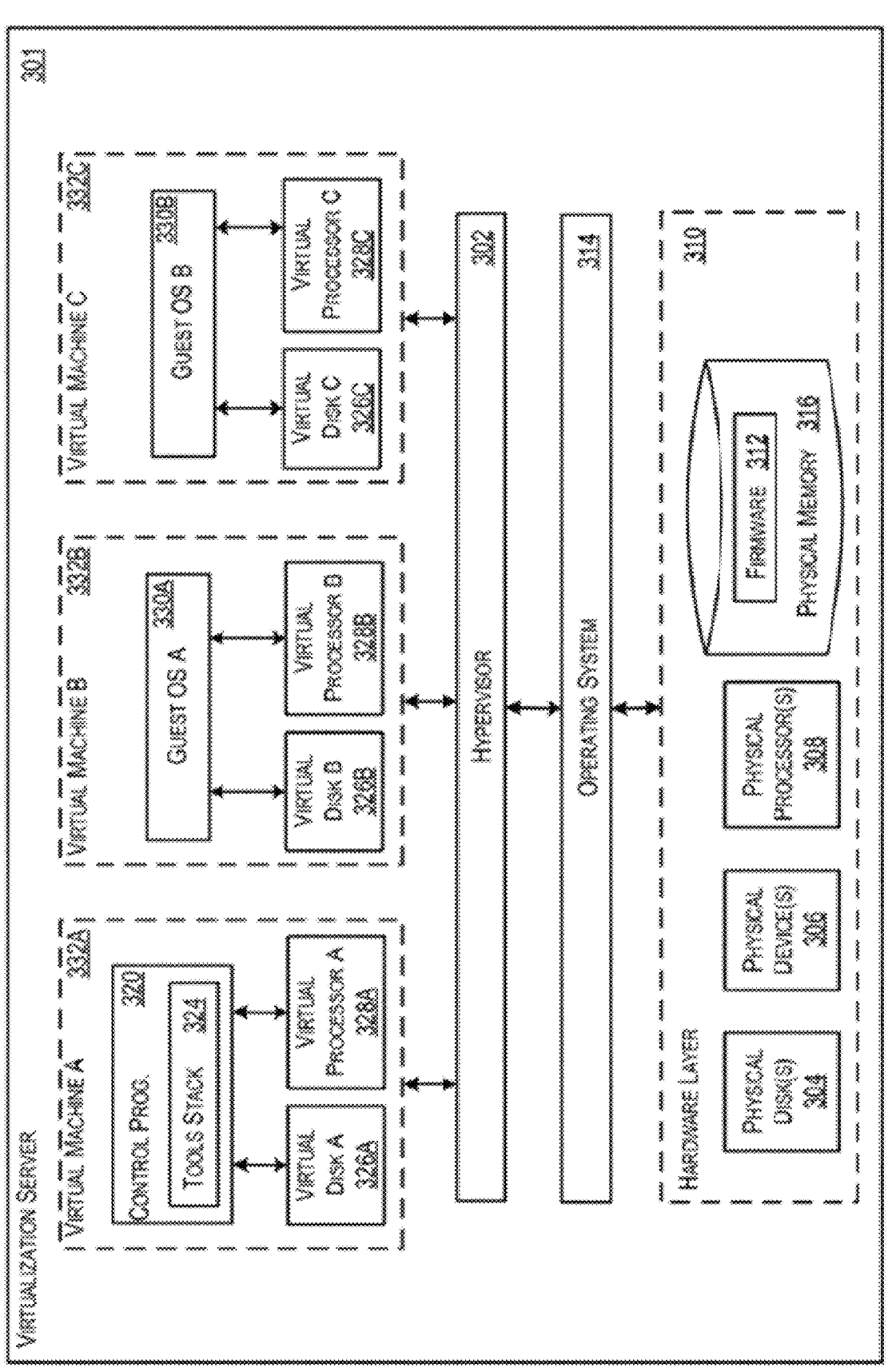
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in physical memory 316 and can be executed by one or more of the physical processors 308. Virtualization server 301 may further include an operating system 314 that may be stored in a memory element in physical memory 316 and executed by one or more of the physical processors 308. Still further, a hypervisor 302 may be stored in a memory element in physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, Dom0, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine. Hypervisor 302 may be a Type 2 hypervisor, where the hypervisor executes within an operating system 314 executing on virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while a Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301 and may include program data stored in physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Florida.

Hypervisor 302 may create one or more VMs 332B-C (generally 332) in which guest operating systems 330 execute. In some embodiments, hypervisor 302 may load a VM image to create VM 332. In other embodiments, hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by virtualization server 301 (e.g., any hardware resource available within hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to VM 332.

As shown in FIG. 3, virtualization server 301 may host or execute one or more VMs 332. A VM 332 is a set of executable instructions that, when executed by processor 308, may imitate the operation of a physical computer such that VM 332 can execute programs and processes much like a physical computing device. While FIG. 3 illustrates an embodiment where virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to VMs 332.

Each VM 332 may include a virtual disk 326A-C (generally 326) and a virtual processor 328A-C (generally 328.) Virtual disk 326, in some embodiments, is a virtualized view of one or more physical disks 304 of virtualization server 301, or a portion of one or more physical disks 304 of virtualization server 301. The virtualized view of physical disks 304 can be generated, provided, and managed by hypervisor 302. In some embodiments, hypervisor 302 provides each VM 332 with a unique view of physical disks 304. Thus, in these embodiments, the particular virtual disk 326 included in each VM 332 can be unique when compared with the other virtual disks 326.

Virtual processor 328 can be a virtualized view of one or more physical processors 308 of virtualization server 301. In some embodiments, the virtualized view of physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of virtual processor 328 are different than the characteristics of the corresponding physical processor 308.

Figure 4:
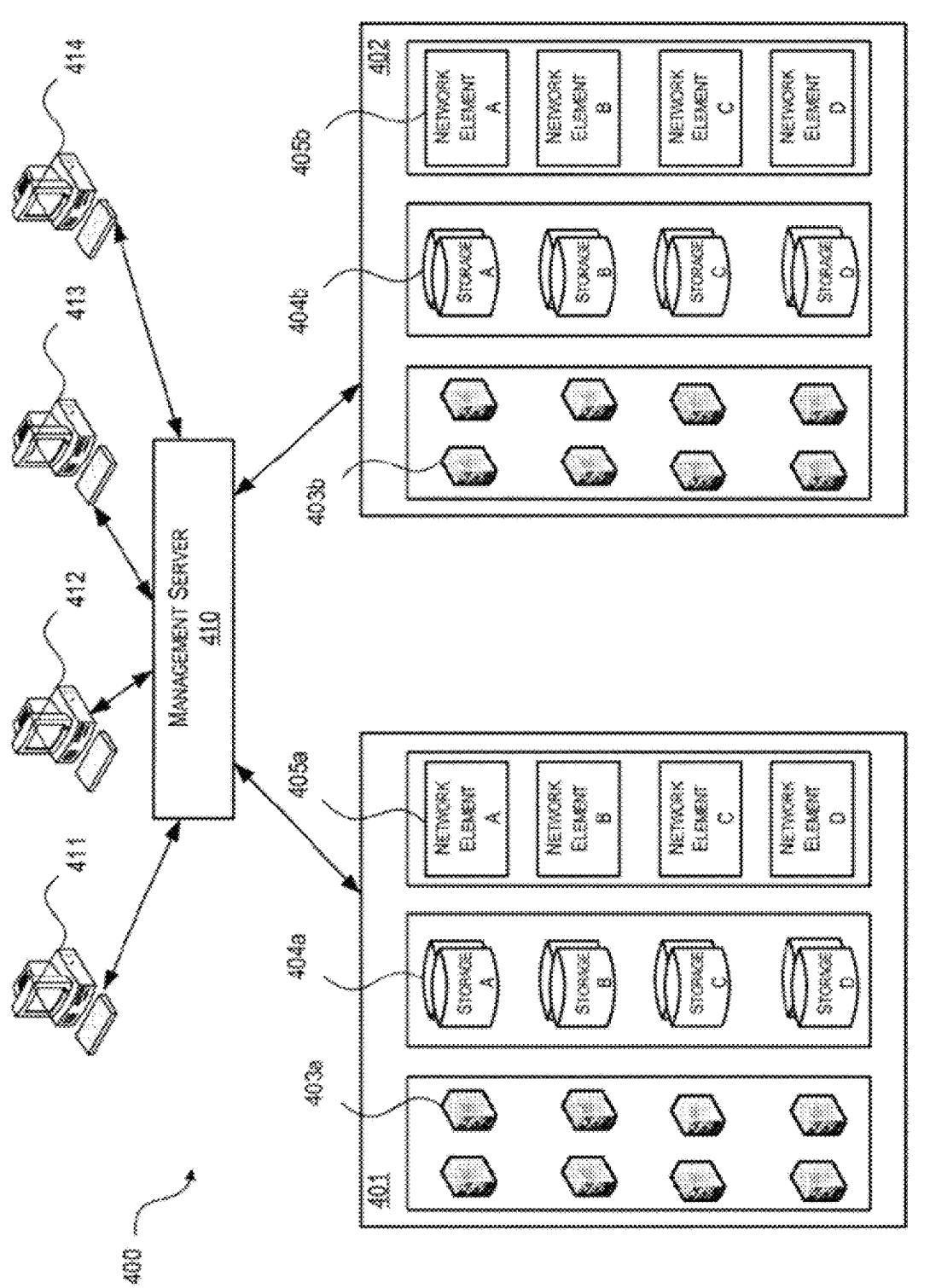
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred to herein as "host servers 403"), storage resources 404a-404b (generally referred to herein as "storage resources 404"), and network resources 405a-405b (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, MA, among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. Management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, management server 410 may include a resource manager configured to select and provision physical resources in the hardware layer of the cloud system based on the client requests. For example, management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. Management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Washington), AMAZON EC2 (Amazon.com Inc. of Seattle, Washington), IBM BLUE CLOUD (IBM Corporation of Armonk, New York), or others.

Figure 5:
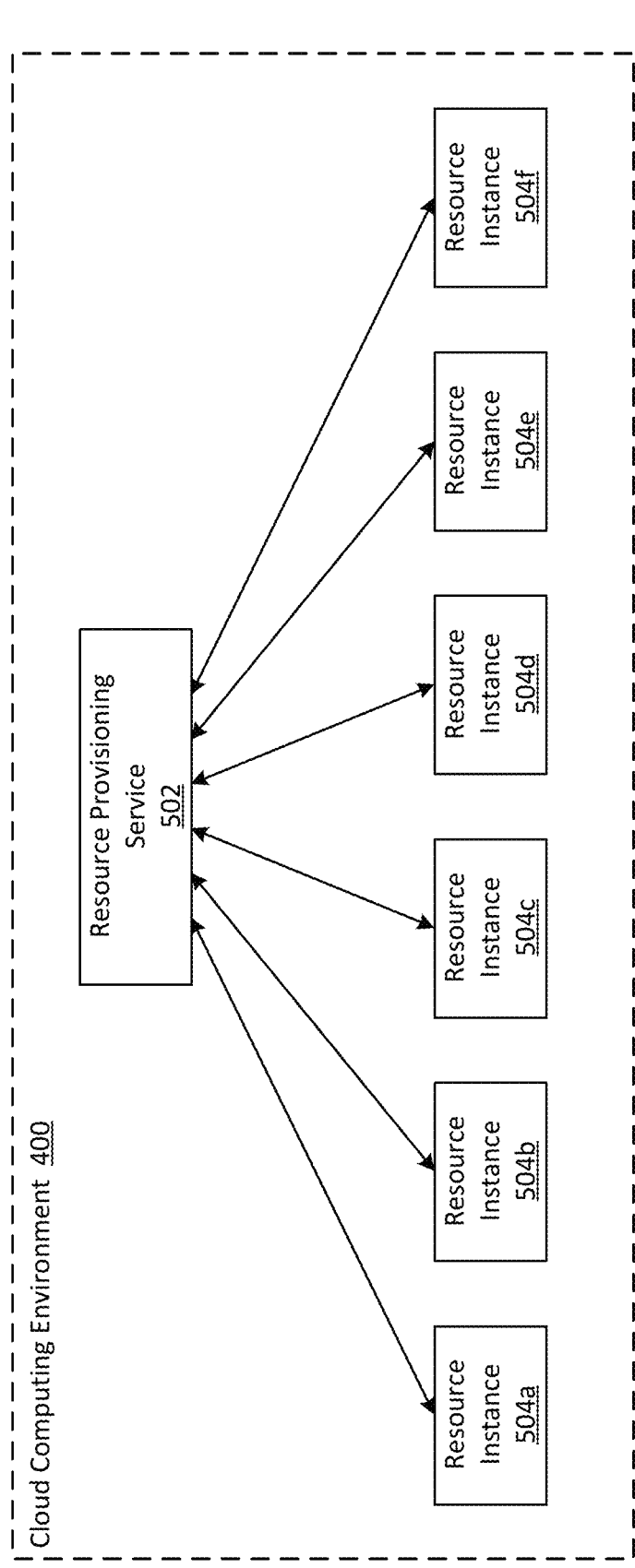
FIG. 5 is a block diagram of an illustrative system architecture including a resource provisioning service deployed in a cloud computing environment, in accordance with an embodiment of the present disclosure.

FIG. 5 is a block diagram of an illustrative system architecture 500 including a resource provisioning service 502 deployed in cloud computing environment 400, in accordance with an embodiment of the present disclosure. In accordance with the various embodiments disclosed herein, resource provisioning service 502 may be implemented by an organization to provision various computing resources in a cloud computing environment, such as cloud computing environment 400. For example, resource provisioning service 502 may be deployed in the organization's data center. In some embodiments, resource provisioning service 502 may be the same or similar to the resource manager of management server 410 of FIG. 4.

Resource provisioning service 502 can handle various aspects for provisioning cloud resources (sometimes referred to herein more simply as "resources" or a "resource" in the singular), assigning tasks to the provisioned resources instances for servicing, and maintaining resource information to keep track of provisioned resource instances and tasks assigned to the provisioned resource instances. A task can be any unit of execution or unit of work such as, for example, power management, a batch job of a specific type, a virtual desktop infrastructure (VDI) session, a virtual application session, a virtual desktop session, and a serverless function to run a job, to provide a few examples.

These cloud resources may refer to any unit of compute resource such as a container (e.g., a stateless container), a virtual machine (VM), a micro VM, or any other infrastructure resource (e.g., virtual clusters, virtual resource pools, physical servers) that provide processing capabilities in the cloud, and combinations thereof. For example, resource provisioning service 502 can provision the resources to service tasks based on the incoming tasks (e.g., incoming requests). The incoming tasks may include tasks that are actually received and/or the tasks that are predicted (i.e., expected) to be received. For example, as shown in FIG. 5, based on the incoming tasks and the capacity of the provisioned resources instances, resource provisioning service 502 may have provisioned six resource instances 504a-504f to service the incoming tasks. Although FIG. 5 shows six resource instances 504a-504f, it will be understood that there may be a different number of provisioned resource instances, for example, depending on the number of incoming tasks and the capacity of the provisioned resource instances to service the incoming tasks.

Figure 6:
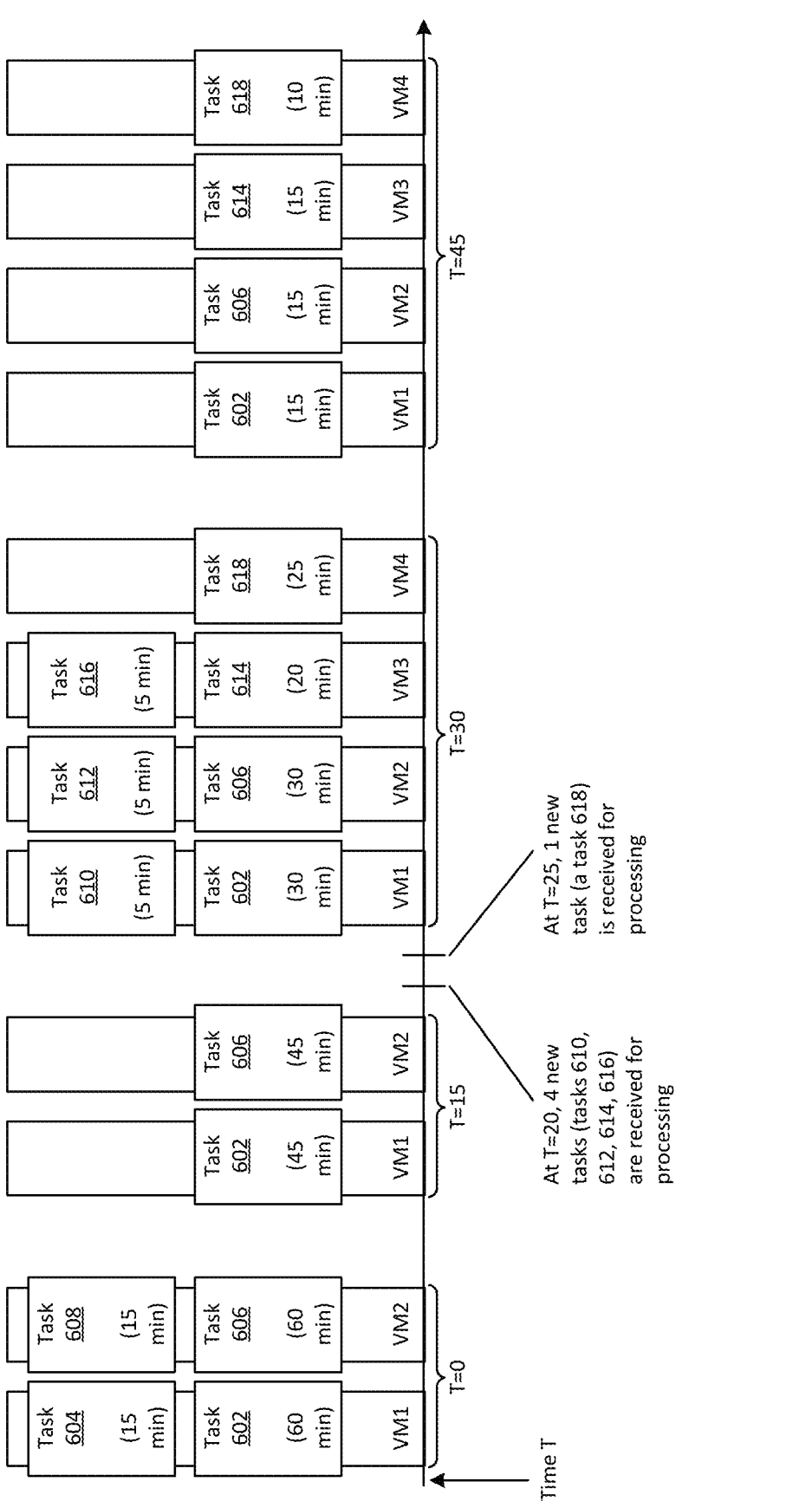
FIG. 6 is a diagram illustrating how tasks can be assigned to resource instances to cause fragmentation of the resource instances.

However, as illustrated in FIG. 6, it is appreciated herein that simply provisioning resource instances to service (i.e., execute) incoming tasks as the tasks are received may result in resource fragmentation. In the example illustrated in FIG. 6, suppose that a resource instance is a virtual machine (VM) and that each VM has the capacity (i.e., load limit) to service a maximum of two (2) tasks. Also suppose that VMs are provisioned and the tasks are assigned to a specific VM instance for servicing based on the order that the tasks are received and the available capacity of the provisioned VM instances. At time T=0, four (4) tasks, tasks 602, 604, 606, 608, may be received for servicing in that order. In this example, suppose that task 602 is a 60 minute (min) task (i.e., will take 60 min of execution time to finish), task 604 is a 15 min task, task 606 is a 60 min task, and task 608 is a 15 min task. When task 602 is received, a first resource instance, VM1, may be provisioned, and task 602 can be assigned to VM1 for servicing. When task 604 is received, task 604 can be assigned to VM1 for servicing since VM1 has the available capacity to service another task. When task 606 is received, a second resource instance, VM2, may be provisioned since VM1 is at full capacity (i.e., VM1 does not have available capacity to service another task), and task 606 can be assigned to VM2 for servicing. When task 608 is received, task 608 can be assigned to VM2 for servicing since VM2 has the available capacity to service another task. Thus, as can be seen in FIG. 6, at time T=0, VM1 may be servicing tasks 602, 604 and VM2 may be servicing tasks 606, 608.

At about time T=15, task 604 that is executing on VM1 and task 608 that is executing on VM2 may finish since these are 15 min tasks. Also, task 602 that is executing on VM1 and task 606 that is executing on VM2 will take 45 more mins (e.g., 60 min-15 min=45 min) to finish. Thus, as shown in FIG. 6, at about time T=15, VM1 may be servicing task 602 and VM2 may be servicing task 606. Note that, at about time T=15, the resource instances are fragmented since both VM1 and VM2 each have available capacity to service another task (i.e., a second task). That is, VM1 and VM2 are inefficiently utilized since one of the resource instances (e.g., VM1) could be servicing tasks 602, 606 and the other resource instance (e.g., VM2) could be shut down to conserve resources, for example. For instance, if tasks 602, 606 were assigned to VM1 and tasks 604, 608 were assigned to VM2, then, at about time T=15, VM1 will be servicing tasks 602, 606 and VM2 can be shut down since tasks 604, 608 which were executing on VM2 would have finished. The result is an efficient utilization of the provisioned resource instances in that there is one (1) resource instance (e.g., VM1) servicing both tasks 602, 606 as compared to two (2) resource instances (e.g., VM1 and VM2) servicing tasks 602, 606 and each having available capacity to service another task.

Continuing the example illustrated in FIG. 6, at time T=20, four (4) new tasks, tasks 610, 612, 614, 616, may be received for servicing in that order. Suppose that tasks 610, 612, 616 are 15 min tasks and task 614 is a 30 min task. When task 610 is received, task 610 can be assigned to VM1 for servicing since VM1 has the available capacity to service another task. When task 612 is received, task 612 can be assigned to VM2 for servicing since VM2 has the available capacity to service another task. When task 614 is received, a third resource instance, VM3, may be provisioned since both VM1 and VM2 are now at full capacity (i.e., VM1 and VM2 do not have available capacity to service another task), and task 614 can be assigned to VM3 for servicing. When task 616 is received, task 616 can be assigned to VM3 for servicing since VM3 has the available capacity to service another task.

With continued reference to the example illustrated in FIG. 6, at time T=25, another new task, a task 618, which may be a 30 min task, may be received for servicing. When task 618 is received, a fourth resource instance, VM4, may be provisioned since VM1, VM2, and VM3 are at full capacity, and task 618 can be assigned to VM4 for servicing. As a result, as can be seen in FIG. 6, at time T=30, VM1 may be servicing tasks 602, 610, VM2 may be servicing tasks 606, 612, VM3 may be servicing tasks 614, 616, and VM4 may be servicing task 618. Note that, as shown in FIG. 6, at time T=30, task 602 will have about 30 min of remaining execution time, task 610 will have about 5 min of remaining execution time, task 606 will have about 30 min of remaining execution time, task 612 will have about 5 min of remaining execution time, task 614 will have about 20 min of remaining execution time, task 616 will have about 5 min of remaining execution time, and task 618 will have about 25 min of remaining execution time.

Then, at about time T=45, task 610 which was executing on VM1 would have finished executing and VM1 may be servicing only task 602. Similarly, task 612 which was executing on VM2 would have finished executing and VM2 may be servicing only task 606, and task 616 which was executing on VM3 would have finished executing and VM3 may be servicing only task 614. VM4 may still be servicing task 618. As a result, as shown in FIG. 6, VM1, VM2, VM3, and VM4 are fragmented since one or more of these resource instances are being underutilized. For instance, task 614 can be executing on VM1 in which case VM1 would be at full capacity servicing tasks 602, 614, and task 618 can be executing on VM2 in which case VM2 would be at full capacity servicing tasks 606, 618. If this was the case, VM3 and VM4 can be shut down to conserve resources. Also, in this case, the provisioned resource instances (e.g., VM1 and VM2) will be efficiently utilized since these resource instances are at full capacity. In other words, it is not possible to free up a resource instance, so that the resource instance can be shut down, by reassigning the executing tasks to the resource instances.

Figure 7:
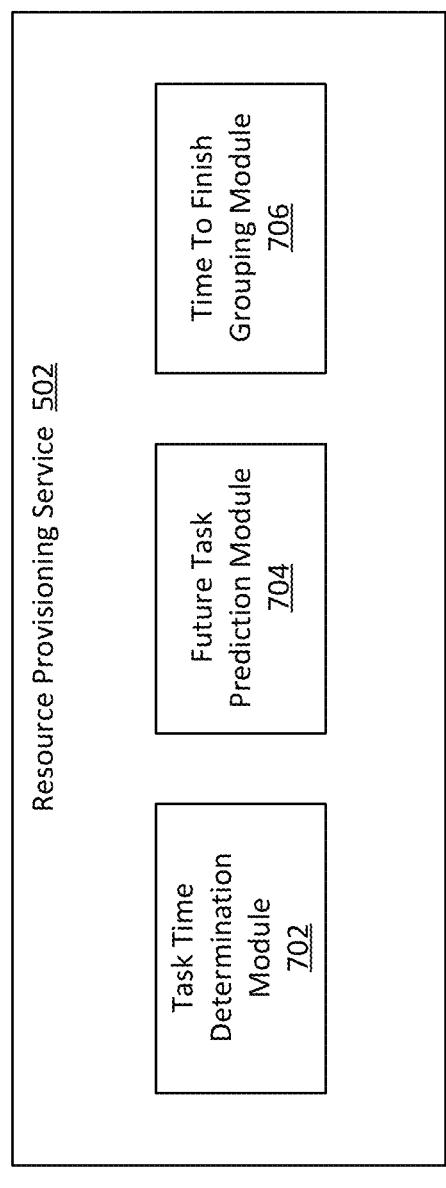
FIG. 7 is a block diagram illustrating an example implementation of a resource provisioning service, in accordance with an embodiment of the present disclosure.

To address the aforementioned and other technical problems and to run (execute) tasks on resource instances in a manner as to reduce (and ideally minimize) fragmentation, in some embodiments, resource provisioning service 502 can be configured to assign a new task to a resource instance based on an average time to finish for the new task. An average time to finish for a task can be an estimation of the time needed (or spent) by a resource instance to execute the task. This estimation may be based on the average of the past execution times for the task and/or similar tasks. In one such embodiment, an average time to finish for a task may be made based on historical task data (e.g., information collected regarding historical task times may indicate that serverless functions serviced in the past take an average of 15 min to execute). In some embodiments, resource provisioning service 502 can be configured to assign a new task to a resource instance based on an average time to finish for the new task and a prediction (estimation) of a number of new tasks that are expected to be received for servicing (sometimes referred to herein as "future tasks" or a "future task" in the singular). To this end, resource provisioning service 502 can include one or more software modules configured to implement certain of the functionalities disclosed herein, and optionally can further include hardware configured to enable such implementation. For example, as shown in FIG. 7, resource provisioning service 502 can include a task time determination module 702, a future task prediction module 704, and a time to finish grouping module 706.

Task time determination module 702 can be configured to determine an average time to finish for a task that is to be serviced. For example, task time determination module 702 can determine an average time to finish for a new task that is received by resource provisioning service 502 for servicing. In some such embodiments, the determination of the average time to finish for a new task may be made based on historical task data (e.g., information collected regarding historical tasks received and processed by resource provisioning service 502). Examples of historical task data include types of historical tasks, execution times for the historical tasks, approximate times the historical tasks were received, and approximate times the historical tasks were serviced (executed), among others. For example, the historical task data may indicate that a serverless function to run a specific job during a scheduled time (e.g., between 8 AM and 10 AM on weekdays) takes an average of 15 min to execute. As another example, the historical task data may indicate that power management of a specific number of VMs, such as 100 of VMs, takes an average of 45 min to execute. As still another example, the historical task data may indicate that an average session time for a User X is 120 min. As discussed in more detail below, the average times to finish may be used, in part, to assign new tasks to resource instances for servicing.

For example, based on the historical task data, task time determination module 702 can determine average times to finish for individual tasks as shown in TABLE 1. The number of different tasks depicted in TABLE 1 is for illustration, and those skilled in the art will appreciate that there may be a different number of different tasks (e.g., a different number of tasks may be determined from the historical task data).

TABLE 1

| Task | Average Time to Finish |
|---|---|
| Task 1 | 10 minutes |
| Task 2 | 5 minutes |
| Task 3 | 25 minutes |
| Task 4 | 30 minutes |
| Task 5 | 60 minutes |
| Task 6 | 400 minutes |

In the example of TABLE 1, the historical task data indicates that Task 1 has an average time to finish of 10 min, Task 2 has an average time to finish of 5 min, Task 3 has an average time to finish of 25 min, Task 4 has an average time to finish of 30 min, Task 5 has an average time to finish of 60 min, and Task 6 has an average time to finish of 400 min. To determine an average time to finish for a new task, task time determination module 702 can identify the task that matches or most closely matches the new task, and use the average time to finish corresponding to the identified task as a prediction of the average time to finish for the new task.

Future task prediction module 704 can be configured to predict a number of future tasks. In some embodiments, future task prediction module 704 can include a time series model such as an autoregressive integrated moving average (ARIMA) model or other suitable autoregressive moving average (ARMA) model. The time series model can be trained using a training dataset (e.g., time series data) generated from the historical task data. Once fitted to the time series data, the trained time series model can be used to predict (forecast) the number of future tasks.

Time series forecasting is the use of a model to predict future events from a time series (e.g., periodicity in the historical task data). A time series is an ordered sequence of data points occurring at successive points in time. Time series data have a natural temporal ordering. The time series is analyzed to identify patterns with the assumption that these patterns will exist in the future.

In some embodiments, future task prediction module 704 can predict the number of future tasks that are expected within a next N minutes such as 10 min, 15 min, 30 min, 45 min, 60 min, or any other desired period of time. In one such embodiment, future task prediction module 704 can predict the number of future tasks that are expected within a next average time to finish for a new task that is received for processing. For example, if an average time to finish for a new task is 15 min, future task prediction module 704 can be used to predict a number of future tasks that are expected within the next 15 min.

In some embodiments, a different time series model can be trained for the various task types. For example, suppose the task types include 30 min tasks (i.e., tasks whose average time to finish is 30 min), 45 min tasks (i.e., tasks whose average time to finish is 45 min), and 60 min tasks (i.e., tasks whose average time to finish is 60 min). In this example case, a first time series model can be trained to predict a number of 30 min future tasks, a second time series model can be trained to predict a number of 45 min future tasks, and a third time series model can be trained to predict a number of 60 min future tasks.

Time to finish grouping module 706 can be configured to group the time to finish data of the serviced tasks (e.g., execution times of the historical tasks). The grouping of the times may then be used as the times for determining the groupings for the provisioned resource instances. In some embodiments, time to finish grouping module 706 can include a machine learning (ML) algorithm such as a k-means clustering algorithm or other suitable clustering algorithm. The ML algorithm may be applied to a training dataset generated from the time to finish data of the historical tasks. The output of the ML algorithm may be one or more classification groups (i.e., clusters) of the times to finish that are based on a distribution of the applied training dataset. For example, when applied to the time to finish data illustrated in TABLE 1 above, a clustering algorithm may output three (3) classification groups, e.g., a 10 min time to finish group, a 30 min time to finish group, and a 60 min time to finish group. These classification group times can then be used as the times for determining the groupings for the provisioned resource instances. Continuing the above example, among the provisioned resource instances, there may be a first group of one or more resource instances servicing tasks having an average time to finish of 10 min, there may be a second group of resource instances servicing tasks having an average time to finish of 30 min, and there may be a third group of resource instances servicing tasks having an average time to finish of 60 min.

In one embodiment, the average time to finish corresponding to the groups of resource instances can be considered in determining the type of future tasks to predict. For instance, assuming the resource instance grouping times in the above example, when predicting the number of future tasks, future task prediction module 704 can be used to predict a number of 10 min future tasks (i.e., future tasks whose average time to finish is 10 min), a number of 30 min future tasks, and a number of 60 min future tasks.

With continued reference to FIG. 7, in an example use case and embodiment, upon receiving a new task for servicing, resource provisioning service 502 may use task time determination module 702 to determine an average time to finish for the new task. Resource provisioning service 502 may then determine whether there is a provisioned resource instance that is designated (assigned) to service tasks whose average time to finish matches the new task's average time to finish. If such a resource instance is identified, resource provisioning service 502 may determine whether the identified resource instance has the available capacity to service the new task. In some such embodiments, the determination of whether the resource instance has the available capacity to service the new task may be based on the average time to finish for the new task. For example, if a current load on the resource instance is such that the new task, if assigned to the resource instance, is unable to execute and/or finish execution based on its average time to finish, then it may be determined that the resource instance does not have the available capacity to service the new task. Conversely, if a current load on the resource instance is such that the new task, if assigned to the resource instance, is able to execute and/or finish execution based on its average time to finish, then it may be determined that the resource instance does have the available capacity to service the new task. If the identified resource instance has the available capacity to service the new task, resource provisioning service 502 may assign the new task to the identified resource instance for servicing (execution).

Otherwise, if the identified resource instance does not have the available capacity to service the new task, resource provisioning service 502 may check to determine whether there is another provisioned resource instance that is designated to service tasks whose average time to finish matches the new task's average time to finish. If resource provisioning service 502 identifies another such resource instance, resource provisioning service 502 may assign the new task to the identified other resource instance for servicing (execution) if this resource instance has the available capacity to service the new task. In this way, resource provisioning service 502 can check all provisioned resource instances designated to service tasks whose average time to finish matches the new task's average time to finish to determine whether one of these resource instances has the available capacity to service the new task.

If there is no provisioned resource instance designated to service tasks whose average time to finish matches the new task's average time to finish or all such resource instances have been checked for available capacity to service the new task, resource provisioning service 502 may determine whether there is a provisioned resource instance that has available capacity (i.e., resource instance is not at full capacity). Here, the check is to determine whether there are other provisioned resource instances (e.g., provisioned resource instances designated to service tasks of different average times to finish) that have available capacity. If there are no such provisioned resource instances that have available capacity, resource provisioning service 502 may provision a new resource instance and assign the new task to the newly provisioned resource instance for servicing. In some embodiments, resource provisioning service 502 may designate (assign) the newly provisioned resource instance to service tasks that have an average time to finish that is the same as the average time to finish for the new task. For example, suppose that the new task that is assigned to the provisioned resource instance has an average time to finish of 10 min. In this example case, the provisioned resource instance can be designated to service tasks having an average time to finish of 10 min.

Otherwise, if resource provisioning service 502 identifies a provisioned resource instance designated to service tasks having a different average time to finish which has available capacity, according to one embodiment, resource provisioning service 502 may determine whether such resource instance has the available capacity to service the new task. If the identified resource instance has the available capacity to service the new task, resource provisioning service 502 may assign the new task to the identified resource instance for servicing (execution).

With continued reference to the above example use case, in some embodiments, resource provisioning service 502 may also consider the expected number of future tasks in assigning the new task to a resource instance for servicing. For example, resource provisioning service 502 may check for expected future tasks to avoid assigning the new task to a provisioned resource instance which may be needed to service one or more of the expected future tasks. To do so, in one such embodiment, before assigning the new task to a provisioned resource instance (i.e., a resource instance designated to service tasks having different average times to finish than the average time to finish for the new task), resource provisioning service 502 may identify the provisioned resource instances that have the available capacity to service the new task. Note that the identified resource instances are the provisioned resource instances that are designated to service tasks whose average time to finish is different than the average time to finish for the new task. Resource provisioning service 502 may then group the identified resource instances according to a task type such as the average time to finish assigned to the individual resource instance. As a result, the provisioned resource instances in a group are designated to service tasks having the same average time to finish.

Then, for each group (i.e., each group of provisioned resource instances), resource provisioning service 502 may use future task prediction module 704 to predict a number of future tasks expected for that group of provisioned resource instances (sometimes referred to herein as "provisioned resource instance group" or more simply "resource instance group"). For example, if one resource instance group includes the provisioned resource instances designated to service tasks whose average time to finish is 30 min, future task prediction module 704 can be used to predict a number of 30 min future tasks (i.e., future tasks having an average time to finish of 30 min).

In one embodiment, future task prediction module 704 can be used to predict a number of future tasks that are expected within the next average time to finish for the new task. Thus, in the above example, if the average time to finish for the new task is 60 min, the future task prediction module 704 can be used to predict a number of 30 min future tasks that are expected within the next 60 min. This allows resource provisioning service 502 to consider only the future tasks that may impact assignment of the new task since the new task, if assigned to a provisioned resource instance, would have finished before any of the future tasks that are expected to be received beyond the average time to finish for the new task is actually received.

Resource provisioning service 502 may optionally sort or otherwise order the resource instance groups in descending order of their respective average time to finish. In general, ordering the resource instance groups in descending order allows for utilizing a resource instance group having the largest average time to finish to service the new task and, thus, it is more likely that the new task will finish executing (completed execution) prior to the tasks which are currently being serviced by the resource instance group. This may further reduce possible resource instance fragmentation. Resource provisioning service 502 may select one of the resource instance groups (e.g., a resource instance group having the largest average time to finish) and determine whether the available capacity of the selected resource instance group (i.e., the available capacity of the provisioned resource instances that are in the selected resource instance group) is sufficient to service the predicted number of future tasks that are expected for the selected resource instance group and the new task. Note that the new task is included in this determination since both the new task and the predicted number of future tasks need to be serviced (executed). If resource provisioning service 502 determines that the available capacity of the selected resource instance group is sufficient, resource provisioning service 502 may assign the new task to a resource instance in the selected resource instance group for servicing (execution).

Otherwise, if resource provisioning service 502 determines that the available capacity of the selected resource instance group is not sufficient, resource provisioning service 502 may select another one of the resource instance groups (e.g., a resource instance group having the next largest average time to finish) and determine whether the available capacity of the selected resource instance group is sufficient to service the predicted number of future tasks that are expected for the selected resource instance group and the new task. In this way, resource provisioning service 502 may check the resource instance groups to determine whether a resource instance group of the resource instance groups has sufficient available capacity.

If resource provisioning service 502 determines that none of the resource instance groups have sufficient available capacity, resource provisioning service 502 may provision a new resource instance and assign the new task to the newly provisioned resource instance for servicing. In some embodiments, resource provisioning service 502 may designate (assign) the newly provisioned resource instance to service tasks that have an average time to finish that is the same as the average time to finish of the new task.

Figure 8:
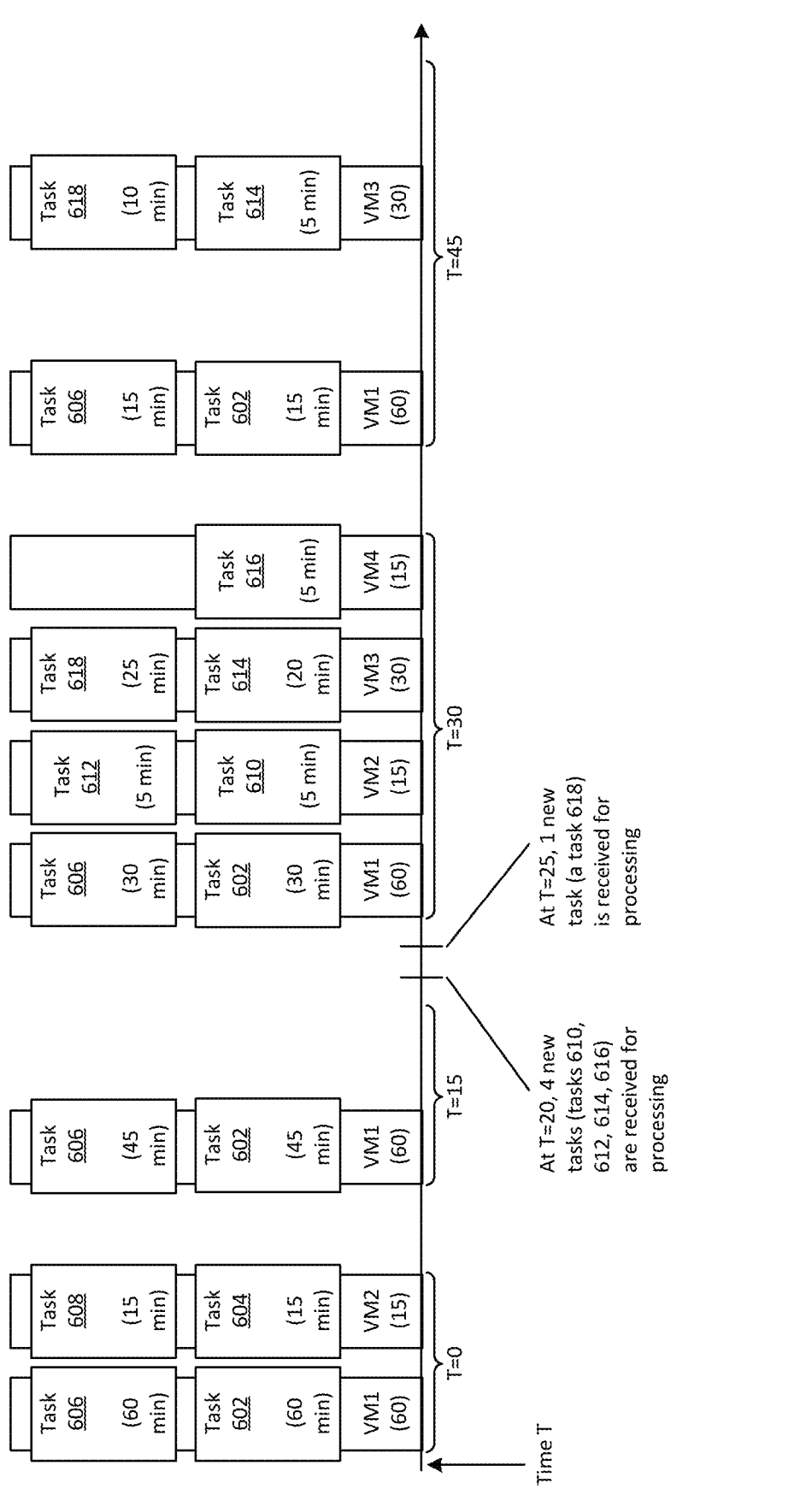
FIG. 8 is a diagram illustrating how tasks can be assigned to resource instances based on an average time to finish, in accordance with an embodiment of the present disclosure.

FIG. 8 is a diagram illustrating how tasks can be assigned to resource instances based on an average time to finish, in accordance with an embodiment of the present disclosure. In FIG. 8, like elements of FIG. 6 are shown using like reference designators and, unless context dictates otherwise, may not be described again for purposes of clarity. Similar to the example in FIG. 6 above, in the example illustrated in FIG. 8, the resource instances may be VMs and each VM may have the capacity (i.e., load limit) to service a maximum of two (2) tasks. At time T=0, tasks 602, 604, 606, 608 may be received for servicing in that order. In this example, suppose that task 602 is determined to have an average time to finish of 60 min, task 604 is determined to have an average time to finish of 15 min, task 606 is determined to have an average time to finish of 60 min, and task 608 is determined to have an average time to finish of 15 min. Here, task 602 may be considered a 60 min task, task 604 may be considered a 15 min task, task 606 may be considered a 60 min task, and task 608 may be considered a 15 min task.

When task 602 is received, a first resource instance, VM1, may be provisioned, and task 602 can be assigned to VM1 for servicing. VM1 may be designated to service tasks having an average time to finish that is the same as the average time to finish of task 602. For example, VM1 may be designated to service 60 min tasks. When task 604 is received, a second resource instance, VM2, may be provisioned, and task 604 can be assigned to VM2 for servicing. VM2 may be designated to service tasks having an average time to finish that is the same as the average time to finish of task 604 (e.g., 15 min tasks). Note that task 604 is not assigned to VM1 even though VM1 has the available capacity to service another task since a new 60 min task (e.g., task 606) may be predicted to be received. When task 606 is received, task 606 can be assigned to VM1 for servicing since VM1 is designated to service 60 min tasks and VM1 has the available capacity to service another task. When task 608 is received, task 608 can be assigned to VM2 for servicing since VM2 is designated to service 15 min tasks and VM2 has the available capacity to service another task. Thus, as can be seen in FIG. 8, at time T=0, VM1 may be servicing tasks 602, 606 and VM2 may be servicing tasks 604, 608.

At about time T=15, tasks 604, 608 which are executing on VM2 may finish since these are 15 min tasks. Also, tasks 602, 606 which are executing on VM1 will take 45 more mins (e.g., 60 min-15 min=45 min) to finish. Thus, as shown in FIG. 8, at about time T=15, VM1 may be servicing tasks 602, 606 and VM2 may be shut down since VM2 is not servicing any task. Note that, at about time T=15, the resource instance, VM1, is servicing both tasks 602, 606. As a result, VM1 is not fragmented and is being efficiently utilized.

Continuing the example illustrated in FIG. 8, at time T=20, tasks 610, 612, 614, 616, may be received for servicing in that order. In this example, suppose that task 610 is determined to have an average time to finish of 15 min, task 612 is determined to have an average time to finish of 15 min, task 614 is determined to have an average time to finish of 30 min, and task 616 is determined to have an average time to finish of 15 min. Here, tasks 610, 612, 616 may be considered 15 min tasks and task 614 may be considered a 30 min task.

When task 610 is received, the second resource instance, VM2, may be provisioned since VM1 is at full capacity, and task 610 can be assigned to VM2 for servicing. VM2 may be designated to service tasks having an average time to finish that is the same as the average time to finish of task 610 (e.g., 15 min tasks). When task 612 is received, task 612 can be assigned to VM2 for servicing since VM2 is designated to service 15 min tasks and VM2 has the available capacity to service another task. When task 614 is received, a third resource instance, VM3, may be provisioned since both VM1 and VM2 are now at full capacity, and task 614 can be assigned to VM3 for servicing. VM3 may be designated to service tasks having an average time to finish that is the same as the average time to finish of task 614 (e.g., 30 min tasks). When task 616 is received, a fourth resource instance, VM4, may be provisioned, and task 616 can be assigned to VM4 for servicing. VM4 may be designated to service tasks having an average time to finish that is the same as the average time to finish of task 616 (e.g., 15 min tasks). Note that task 616 is not assigned to VM1 even though VM3 has the available capacity to service another task since a new 30 min task may be predicted to be received in the future (e.g., within the next average time to finish of task 616—i.e., within the next 15 min).

With continued reference to the example illustrated in FIG. 8, at time T=25, task 618 may be received for servicing. In this example, suppose that task 618 is determined to have an average time to finish of 30 min (e.g., task 618 may be considered a 30 min task). Note that task 618 may be the new 30 min task which was predicted to be received. When task 618 is received, task 618 can be assigned to VM3 for servicing since VM3 is designated to service 30 min tasks and VM3 has the available capacity to service another task. As a result, as can be seen in FIG. 8, at time T=30, VM1 may be servicing tasks 602, 606, VM2 may be servicing tasks 610, 612, VM3 may be servicing tasks 614, 618, and VM4 may be servicing task 616. Note that, as shown in FIG. 8, at time T=30, task 602 will have about 30 min of remaining execution time, task 606 will have about 30 min of remaining execution time, task 610 will have about 5 min of remaining execution time, task 612 will have about 5 min of remaining execution time, task 614 will have about 20 min of remaining execution time, task 618 will have about 25 min of remaining execution time, and task 616 will have about 5 min of remaining execution time.

Then, at about time T=45, tasks 610, 612 which were executing on VM2 and task 616 which was executing on VM4 would have finished executing since tasks 610, 612, 616 were 15 min tasks. Also, tasks 602, 606 which are executing on VM1 will take 15 more mins (e.g., 60 min-45 min=15 min) to finish. Task 614 which is executing on VM3 will take 5 more min (e.g., 30 min-25 min=5 min) to finish, and task 618 which is executing on VM3 will take 10 more min (e.g., 30 min-20 min=10 min) to finish. Thus, as shown in FIG. 8, at about time T=45, VM1 may be servicing tasks 602, 606, VM3 may be servicing tasks 614, 618, and VM2 and VM4 may be shut down since VM2 and VM4 are not servicing any task. Note that, at about time T=45, the resource instances, VM1 and VM3, are each servicing two (2) tasks and do not have available capacity. As a result, VM1 and VM3 are not fragmented and are being efficiently utilized.

Figure 9A:
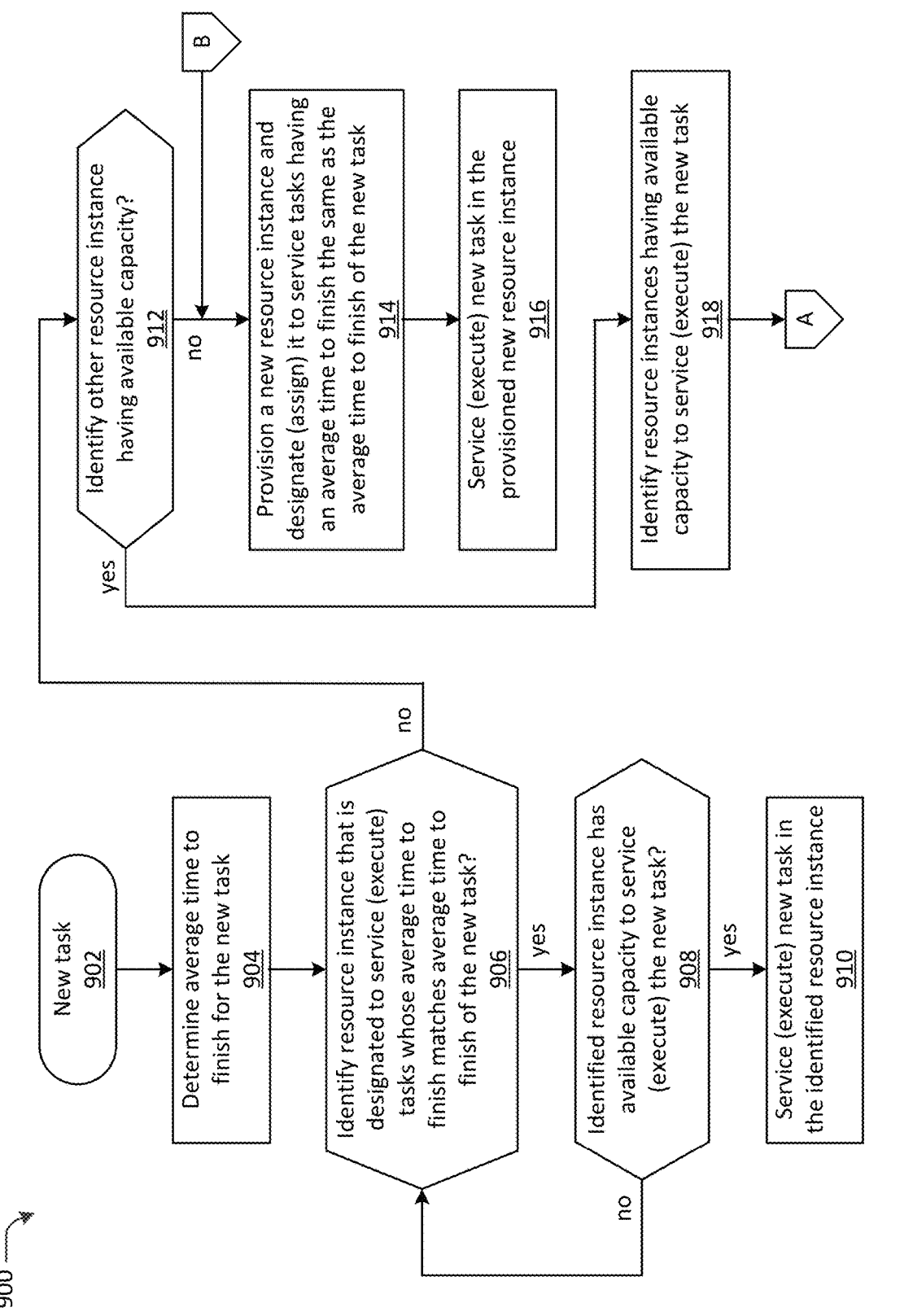
FIGS. 9A and 9B collectively show a flow diagram of an illustrative process for assigning tasks based on an average time to finish, in accordance with an embodiment of the present disclosure.
Figure 9B:
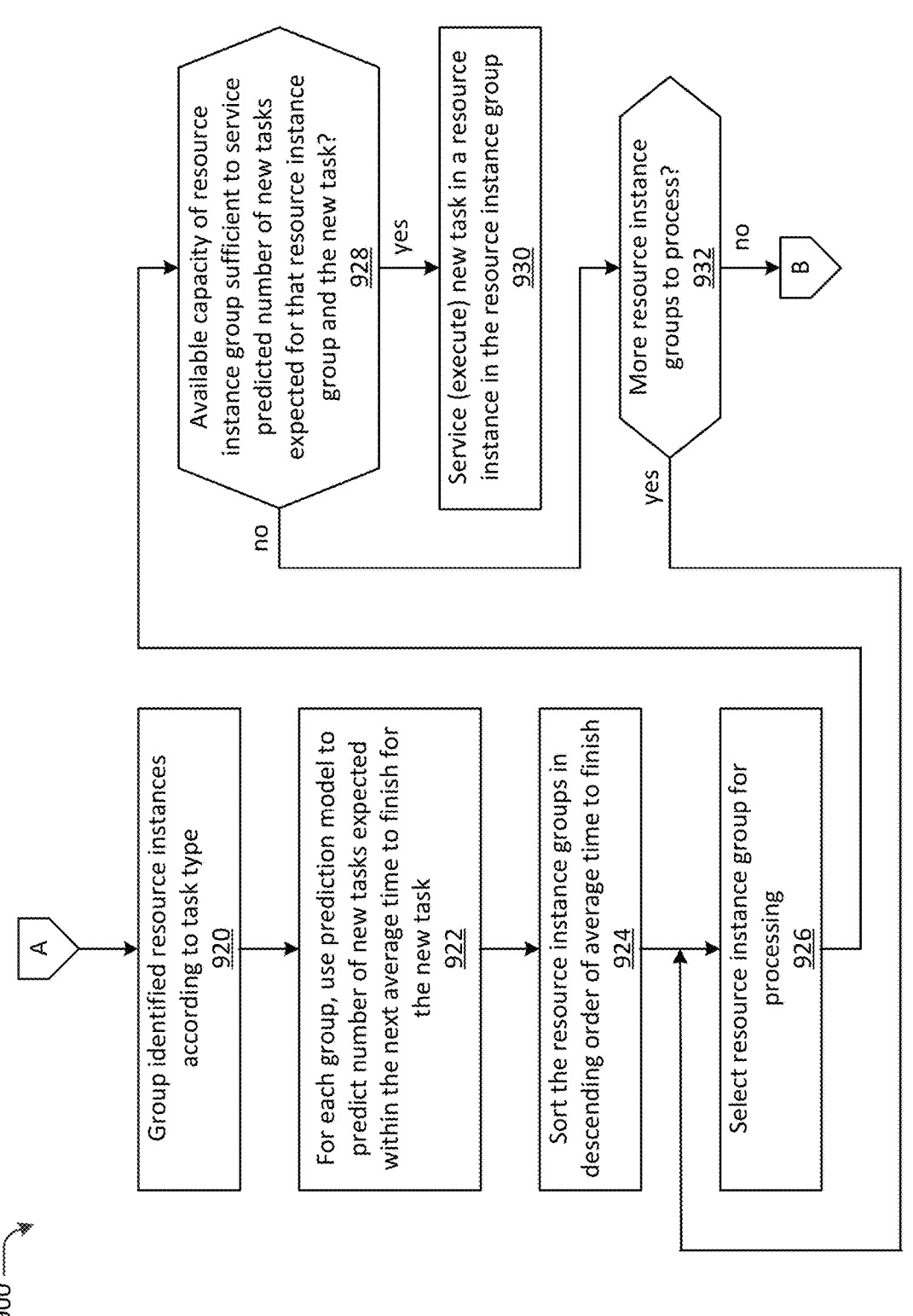

FIGS. 9A and 9B collectively show a flow diagram of an illustrative process 900 for assigning tasks based on an average time to finish, in accordance with an embodiment of the present disclosure. For example, process 900 can be implemented within a resource provisioning service (e.g., resource provisioning service 502 of FIG. 5) running in a cloud computing environment (e.g., cloud computing environment 400 of FIGS. 4 and 5). In some embodiments, the operations, functions, or actions illustrated in example process 900 may be stored as computer-executable instructions in a computer-readable medium, such as RAM 113, ROM 115, and/or memory 121 of data server 103 of FIG. 2, RAM 205, ROM 207, and/or memory 215 of computing device 201 of FIG. 2, and/or physical memory 316 of computer device 301 of FIG. 3.

With reference to process 900 of FIG. 9A, at 902, the resource provisioning service can receive a new task that is to be serviced. For example, the new task may be a request for a virtual machine (VM) session.

At 904, the resource provisioning service can determine an average time to finish for the new task. The average time to finish for the new task can be determined based on historical task data. In an implementation, the resource provisioning service can use a task time determination module (e.g., task time determination module 702 of FIG. 7) to determine an average time to finish for the new task. Continuing the above example, the resource provisioning service can determine that the average time to finish for the requested VM session is 60 min.

At 906, the resource provisioning service can determine whether there is a provisioned resource instance that is designated (assigned) to service tasks whose average time to finish matches the new task's average time to finish. Continuing the above example, the resource provisioning service can determine whether there is a provisioned VM instance that is designated to service 60 min tasks.

If such a provisioned resource instance is identified (e.g., a provisioned VM designated to service 60 min tasks is identified), then, at 908, the resource provisioning service can determine whether the identified resource instance has the available capacity to service the new task. Continuing the above example, the resource provisioning service can determine whether the identified VM instance designated to service 60 min tasks has the available capacity to service the requested 60 min VM session.

If the identified resource instance has the available capacity to service the new task, then, at 910, the resource provisioning service can assign the new task to the identified resource instance for servicing. The identified resource instance can then service the new task. Continuing the above example, if the identified VM instance designated to service 60 min tasks has the available capacity to service the requested 60 min VM session, the resource provisioning service can assign the requested 60 min VM session to the identified VM instance.

Otherwise, if the identified resource instance does not have the available capacity to service the new task, then, at 906, the resource provisioning service can determine whether there is another provisioned resource instance that is designated (assigned) to service tasks whose average time to finish matches the new task's average time to finish. Continuing the above example, if the identified VM instance designated to service 60 min tasks does not have the available capacity to service the requested 60 min VM session, the resource provisioning service can then determine whether there is another VM instance that is designated to service 60 min tasks. In this way, the resource provisioning service can check all the appropriate provisioned resource instances (e.g., check all the VM instances designated to service 60 min tasks) to determine whether the new task can be assigned to one such provisioned resource instance.

Otherwise, if, at 906, the resource provisioning service is unable to identify a provisioned resource instance that is designated (assigned) to service tasks whose average time to finish matches the new task's average time to finish, then, at 912, the resource provisioning service can determine whether there is a provisioned resource instance that has the available capacity to service the new task. Here, the check is for a provisioned resource instance that is designated to service tasks whose average time to finish is different than the new task's average time to finish. Continuing the above example, the resource provisioning service can determine whether there is a VM instance designated to service tasks other than 60 min tasks, and whether any such VM instance has the available capacity to service the requested 60 min VM session.

If, at 912, the resource provisioning service unable to identify any provisioned resource instance that has the available capacity to service the new task, then, at 914, the resource provisioning service can provision a new resource instance and designate (assign) the provisioned resource instance to service tasks that have an average time to finish that is the same as the new task's average time to finish. Continuing the above example, if the resource provisioning service is unable to identify any VM instance that has the available capacity to service the requested 60 min VM session, the resource provisioning service can provision a new VM instance and designate the new VM instance to service 60 min tasks.

At 916, the resource provisioning service can assign the new task to the newly provisioned resource instance for servicing. The newly provisioned resource instance can then service the new task. Continuing the above example, the resource provisioning service can assign the requested 60 min VM session to the newly provisioned VM instance designated to service 60 min tasks for servicing. The newly provisioned VM instance can then service the requested 60 min VM session.

Otherwise, if, at 912, the resource provisioning service is able to identify a provisioned resource instance that has the available capacity to service the new task, then, at 918, the resource provisioning service can identify all provisioned resource instances that have the available capacity to service the new task. Continuing the above example, if the resource provisioning service is able to identify a VM instance that has the available capacity to service the requested 60 min VM session, the resource provisioning service can identify all VM instances that have the available capacity to service the requested 60 min VM session.

At 920, the resource provisioning service can group the identified provisioned resource instances according to task type. One example task type is the average time to finish assigned to the individual resource instances. In an implementation, the resource provisioning service can use a time to finish grouping module (e.g., time to finish grouping module 706 of FIG. 7) to group the identified resource instances according to the average time to finish. Continuing the above example, the resource provisioning service can group the identified VM instances that have the capacity to service the requested 60 min VM session according to their designated average time to finish (e.g., 15 min, 30 min, 45 min, 60 min, 90 min, etc.).

At 922, for each provisioned resource instance group, the resource provisioning service can predict a number of future tasks expected for that provisioned resource instance group within the next average time to finish for the new task. In an implementation, the resource provisioning service can use a future task prediction module (e.g., future task prediction module 704 of FIG. 7) to predict the number of future tasks expected for that provisioned resource instance group. Continuing the above example, the resource provisioning service can predict a number of future tasks expected for each VM instance group (e.g., group of VM instances designated to service 15 min tasks, group of VM instances designated to service 30 min tasks, group of VM instances designated to service 45 min tasks, group of VM instances designated to service 60 min tasks, group of VM instances designated to service 90 min tasks, etc.) within the next 60 min, since the request is for a 60 min VM session.

At 924, the resource provisioning service can sort or otherwise order the resource instance groups in descending order of their respective average time to finish. Continuing the above example, the resource provisioning service can sort the VM instance groups in descending order of their designated average time to finish. An example sorting of the VM instance groups may be as follows: the group of VM instances designated to service 90 min tasks, the group of VM instances designated to service 60 min tasks, the group of VM instances designated to service 45 min tasks, the group of VM instances designated to service 30 min tasks, followed by the group of VM instances designated to service 15 min tasks.

At 926, the resource provisioning service can select a resource instance group for processing. For example, the resource instance group having the largest average time to finish can be selected for processing. Continuing the above example, the resource provisioning service can select the VM instance group having the largest designated average time to finish (e.g., the group of VM instances designated to service 90 min tasks) for servicing.

At 928, the resource provisioning service can determine whether the available capacity of the selected resource instance group (i.e., the available capacity of the provisioned resource instances that are in the selected resource instance group) is sufficient to service the predicted number of future tasks that are expected for the selected resource instance group and the new task. Continuing the above example, the resource provisioning service can determine whether the available capacity of the select VM instance group is sufficient to service the predicted number of future tasks expected for the selected VM instance group and the requested 60 min VM session. Note that the predicted number of future tasks is the predicted number of future tasks expected within the next 60 min, since the request is for a 60 min VM session.

In other embodiments, the predicted number of future tasks may be a predicted number of future tasks expected within the next specified period of time, such as, for example, next 30 min, next 45 min, next 60 min, or next 120 min, to provide a few examples. In such embodiments, user, such as a system administrator, may specify the period of time to use for the prediction of the future tasks.

If, at 928, the resource provisioning service determines that the available capacity of the selected resource instance group is sufficient to service the predicted number of future tasks that are expected for the selected resource instance group and the new task, then at 930, the resource provisioning service can assign the new task to a resource instance in the selected resource instance group for servicing. The resource instance in the selected resource instance group can then service the new task. Continuing the above example, if the resource provisioning service determines that the available capacity of the selected VM instance group is sufficient to service the predicted number of future tasks expected for the selected VM instance group and the requested 60 min VM session, the resource provisioning service can assign the requested 60 min VM session to a VM instance in the selected VM instance group for servicing. The VM instance in the selected VM instance group can then service the requested 60 min VM session.

Otherwise, if, at 928, the resource provisioning service determines that the available capacity of the selected resource instance group is not sufficient to service the predicted number of future tasks that are expected for the selected resource instance group and the new task, then at 932, the resource provisioning service can determine whether there is another provisioned resource instance group to process. Continuing the above example, if the resource provisioning service determines that the available capacity of the selected VM instance group is not sufficient to service the predicted number of future tasks expected for the selected VM instance group and the requested 60 min VM session, the resource provisioning service can determine whether there is another VM instance group to process.

If, at 932, the resource provisioning service determines that there is another provisioned resource instance group to process, then at 926, the resource provisioning service can select another resource instance group from the provisioned resource instance groups for processing. The resource provisioning service can then process the selected resource instance group as described herein above. For example, the resource instance group having the next largest average time to finish can be selected for processing. Continuing the above example, the resource provisioning service can select another VM instance group (e.g., the group of VM instances designated to service 60 min tasks) from the provisioned VM instance groups for processing. The resource provisioning service can then process the selected VM instance group.

Otherwise, if, at 932, the resource provisioning service determines that there is no other provisioned resource instance group to process, then at 914, the resource provisioning service can provision a new resource instance and designate (assign) the provisioned resource instance to service tasks that have an average time to finish that is the same as the new task's average time to finish. Continuing the above example, if the resource provisioning service determines that there are no other provisioned VM instance groups to process, the resource provisioning service can provision a new VM instance and designate the new VM instance to service 60 min tasks.

Then, at 916, the resource provisioning service can assign the new task to the newly provisioned resource instance for servicing. The newly provisioned resource instance can then service the new task. Continuing the above example, the resource provisioning service can assign the requested 60 min VM session to the newly provisioned VM instance designated to service 60 min tasks for servicing. The newly provisioned VM instance can then service the requested 60 min VM session.

Further Example Embodiments

The following examples pertain to further embodiments, from which numerous permutations and configurations will be apparent.

Example 1 includes a method including: determining, by a computing device, an average time to finish for a first task to be executed; determining, by the computing device, whether there is a resource instance that is designated to service tasks whose average time to finish matches the average time to finish for the first task; responsive to a determination that there is a resource instance that is designated to service tasks whose average time to finish matches the average time to finish for the first task, determining, by the computing device, whether the resource instance has available capacity to service the first task; and, responsive to a determination that the resource instance has available capacity to service the first task, assigning, by the computing device, the first task to the resource instance.

Example 2 includes the subject matter of Example 1, wherein determining whether the resource instance has available capacity to service the first task is based on the average time to finish for the first task.

Example 3 includes the subject matter of any of Examples 1 and 2, further including: determining, by the computing device, an average time to finish for a second task to be executed; determining, by the computing device, whether there is a resource instance that is designated to service tasks whose average time to finish matches the average time to finish for the second task; and, responsive to a determination that there is no resource instance that is designated to service tasks whose average time to finish matches the average time to finish for the second task: determining, by the computing device, whether there is a resource instance that has available capacity to service the second task; and, responsive to a determination that there is no resource instance that has available capacity to service the second task: provisioning, by the computing device, a new resource instance; and assigning, by the computing device, the second task to the new resource instance.

Example 4 includes the subject matter of Example 3, further including designating, by the computing device, the new resource instance to service tasks having an average time to finish of the second task.

Example 5 includes the subject matter of any of Examples 3 and 4, further including, responsive to a determination that there is a resource instance that has available capacity to service the second task: identifying, by the computing device, a group of one or more resource instances that have available capacity to service the second task, the one or more resource instances in the group designated to service tasks having the same average time to finish; determining, by the computing device, a number of third tasks that are expected to be received for servicing, each third task in the number of third tasks having an average time to finish matching the average time to finish of the identified group of resource instances; determining, by the computing device, whether the identified group of resource instances has available capacity to service the number of third tasks that are expected and the second task; and, responsive to a determination that the identified group of resource instances has available capacity to service the number of third tasks that are expected and the second task, assigning, by the computing device, the second task to one resource instance in the identified group of resource instances.

Example 6 includes the subject matter of Example 5, wherein determining a number of third tasks that are expected comprises determining a number of third tasks at are expected within a next average time to finish for the second task.

Example 7 includes the subject matter of any of Examples 5 and 6, wherein determining a number of third tasks that are expected is based on historical task data.

Example 8 includes the subject matter of any of Examples 5 through 7, further including, responsive to a determination that the identified group of resource instances does not have available capacity to service the number of third tasks that are expected and the second task: provisioning, by the computing device, a new resource instance; and assigning, by the computing device, the second task to the new resource instance.

Example 9 includes a system including a memory and one or more processors in communication with the memory and configured to: determine an average time to finish for a first task to be executed; determine whether there is a resource instance that is designated to service tasks whose average time to finish matches the average time to finish for the first task; responsive to a determination that there is a resource instance that is designated to service tasks whose average time to finish matches the average time to finish for the first task, determine whether the resource instance has available capacity to service the first task; and, responsive to a determination that the resource instance has available capacity to service the first task, assign the first task to the resource instance.

Example 10 includes the subject matter of Example 9, wherein to determine whether the resource instance has available capacity to service the first task is based on the average time to finish for the first task.

Example 11 includes the subject matter of any of Examples 9 and 10, wherein the one or more processors are further configured to: determine an average time to finish for a second task to be executed; determine whether there is a resource instance that is designated to service tasks whose average time to finish matches the average time to finish for the second task; and, responsive to a determination that there is no resource instance that is designated to service tasks whose average time to finish matches the average time to finish for the second task: determine whether there is a resource instance that has available capacity to service the second task; and, responsive to a determination that there is no resource instance that has available capacity to service the second task: provision a new resource instance; and assign the second task to the new resource instance.

Example 12 includes the subject matter of Example 11, wherein the one or more processors are further configured to designate the new resource instance to service tasks having an average time to finish of the second task.

Example 13 includes the subject matter of any of Examples 11 and 12, wherein the one or more processors are further configured to, responsive to a determination that there is a resource instance that has available capacity to service the second task: identify a group of one or more resource instances that have available capacity to service the second task, the one or more resource instances in the group designated to service tasks having the same average time to finish; determine a number of third tasks that are expected to be received for servicing, each third task in the number of third tasks having an average time to finish matching the average time to finish of the identified group of resource instances; determine whether the identified group of resource instances has available capacity to service the number of third tasks that are expected and the second task; and, responsive to a determination that the identified group of resource instances has available capacity to service the number of third tasks that are expected and the second task, assign the second task to one resource instance in the identified group of resource instances.

Example 14 includes the subject matter of Example 13, wherein to determine a number of third tasks that are expected comprises to determine a number of third tasks at are expected within a next average time to finish for the new task.

Example 15 includes the subject matter of any of Examples 13 and 14, wherein to determine a number of third tasks that are expected is based on historical task data.

Example 16 includes the subject matter of any of Examples 13 through 15, wherein the one or more processors are further configured to, responsive to a determination that the identified group of resource instances does not have available capacity to service the number of third tasks that are expected and the second task: provision a new resource instance; and assign the second task to the new resource instance.

Example 17 includes a non-transitory computer-readable medium storing program instructions that are executable to: determine, by a computing device, an average time to finish for a first task to be executed; determine, by the computing device, whether there is a resource instance that is designated to service tasks whose average time to finish matches the average time to finish for the first task; responsive to a determination that there is a resource instance that is designated to service tasks whose average time to finish matches the average time to finish for the first task, determine, by the computing device, whether the resource instance has available capacity to service the first task; and, responsive to a determination that the resource instance has available capacity to service the first task, assign, by the computing device, the first task to the resource instance.

Example 18 includes the subject matter of Example 17, wherein to determine whether the resource instance has available capacity to service the first task is based on the average time to finish for the first task.

Example 19 includes the subject matter of any of Examples 17 and 18, wherein the program instructions are further executable to: determine, by the computing device, an average time to finish for a second task to be executed; determine, by the computing device, whether there is a resource instance that is designated to service tasks whose average time to finish matches the average time to finish for the second task; responsive to a determination that there is no resource instance that is designated to service tasks whose average time to finish matches the average time to finish for the second task: determine, by the computing device, whether there is a resource instance that has available capacity to service the second task; and, responsive to a determination that there is no resource instance that has available capacity to service the second task: provision, by the computing device, a new resource instance; and assign, by the computing device, the second task to the new resource instance.

Example 20 includes the subject matter of Example 19, wherein the program instructions are further executable to designate, by the computing device, the new resource instance to service tasks having an average time to finish of the second task.

Example 21 includes the subject matter of any of Examples 19 and 20, wherein the program instructions are further executable to, responsive to a determination that there is a resource instance that has available capacity to service the second task: identify, by the computing device, a group of one or more resource instances that have available capacity to service the second task, the one or more resource instances in the group designated to service tasks having the same average time to finish; determine, by the computing device, a number of third tasks that are expected to be received for servicing, each third task in the number of third tasks having an average time to finish matching the average time to finish of the identified group of resource instances; determine, by the computing device, whether the identified group of resource instances has available capacity to service the number of third tasks that are expected and the second task; and, responsive to a determination that the identified group of resource instances has available capacity to service the number of third tasks that are expected and the second task, assign, by the computing device, the second task to one resource instance in the identified group of resource instances.

Example 22 includes the subject matter of Example 21, wherein to determine a number of third tasks that are expected comprises to determine a number of third tasks at are expected within a next average time to finish for the new task.

Example 23 includes the subject matter of any of Examples 21 and 22, wherein to determine a number of third tasks that are expected is based on historical task data.

Example 24 includes the subject matter of any of Examples 21 through 23, wherein the program instructions are further executable to, responsive to a determination that the identified group of resource instances does not have available capacity to service the number of third tasks that are expected and the second task: provision, by the computing device, a new resource instance; and assign, by the computing device, the second task to the new resource instance.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method executed by a computing device comprising:
   receiving a first request to execute a first virtual session in a cloud computing environment;
   provisioning, based on the first request, a virtual machine (VM) instance of a plurality of VM instances that is designated to service virtual sessions whose average time to finish matches an average time to finish for the first virtual session;
   executing the first virtual session on the VM instance when the VM instance has available capacity to service the first virtual session;
   receiving a second request to execute a second virtual session in the cloud computing environment; and

based on the second request and when there is no VM instance of the plurality of VM instances designated to service virtual sessions whose average time to finish matches an average time to finish for the second virtual session:

provisioning a group of VM instances having a largest average time to finish to minimize VM fragmentation when a number of third virtual sessions that are expected to be executed fall within the average time to finish for the second virtual session, wherein the provisioned group of VM instances is one of a plurality of groups of VM instances that has available capacity to service the second virtual session, and each group of VM instances, in the plurality of groups, have a same average time to finish; and executing the second virtual session on one VM instance in the provisioned group of VM instances when the provisioned group of VM instances has available capacity to service the number of third virtual sessions and the second virtual session.

2. The method of claim 1, wherein executing the first virtual session on the VM instance is based on the average time to finish for the first virtual session.

3. The method of claim 1, further comprising:

receiving a third request to execute a fourth virtual session in the cloud computing environment;

provisioning, based on the third request, a VM instance that is designated to service virtual sessions whose average time to finish matches an average time to finish for the fourth virtual session; and when there is no VM instance of the plurality of VM instances designated to service virtual sessions whose average time to finish matches the average time to finish for the fourth virtual session and there is no VM instance of the plurality of VM instances that has available capacity to service the fourth virtual session:

provisioning a new VM instance; and executing the fourth virtual session on the new VM instance.

4. The method of claim 3, wherein the new VM instance services virtual sessions having an average time to finish matching the average time to finish of the fourth virtual session.

5. The method of claim 1, wherein provisioning the group of VM instances having the largest average time to finish is based on a number of third virtual sessions that are expected within a next average time to finish for the second virtual session.

6. The method of claim 1, wherein provisioning the group of VM instances having the largest average time to finish is based on historical virtual session data.

7. The method of claim 1, further comprising, when the provisioned group of VM instances does not have available capacity to service the number of third virtual sessions that are expected and the second virtual session:

provisioning a new VM instance; and executing the second virtual session on the new VM instance.

8. The method of claim 1, wherein a categorization of the groups of VM instances that have available capacity to service the second virtual session is based on an average time to finish for the second virtual session to be executed by each VM instance in the groups of the VM instances.

9. The method of claim 1, wherein provisioning the group of VM instances having a largest average time to finish is based on a descending ordering of the groups of VM instances that have available capacity to service the second virtual session.

10. The method of claim 1, further comprising:

provisioning a second group of VM instances having a second largest average time to finish to minimize VM fragmentation when the provisioned group of VM instances having the largest average time to finish has no available capacity to service the number of third virtual sessions and the second virtual session, wherein the second group is one of a plurality of groups of VM instances that has available capacity to service the second virtual session.

11. A system comprising:

a memory; and one or more processors in communication with the memory and configured to:

receive a first request to execute a first virtual session in a cloud computing environment;

provision, based on the first request, a virtual machine (VM) instance of a plurality of VM instances that is designated to service virtual sessions whose average time to finish matches an average time to finish for the first virtual session;

execute the first virtual session on the VM instance when the VM instance has available capacity to service the first virtual session;

receive a second request to execute a second virtual session in the cloud computing environment; and based on the second request and when there is no VM instance of the plurality of VM instances designated to service virtual sessions whose average time to finish matches the average time to finish for the second virtual session:

provision a group of VM instances having a largest average time to finish to minimize VM fragmentation when a number of third virtual sessions that are expected to be executed fall within the average time to finish for the second virtual session, wherein the provisioned group of VM instances is one of a plurality of groups of VM instances that has available capacity to service the second virtual session, and each group of VM instances, in the plurality of groups, have a same average time to finish; and execute the second virtual session on one VM instance in the provisioned group of VM instances when the provisioned group of VM instances has available capacity to service the number of third virtual sessions and the second virtual session.

12. The system of claim 11, wherein executing the first virtual session on the VM instance is based on the average time to finish for the first virtual session.

13. The system of claim 11, wherein the one or more processors are further configured to:

receive a third request to execute a fourth virtual session in the cloud computing environment;

provision, based on the third request, a VM instance designated to service virtual sessions whose average time to finish matches an average time to finish for the fourth virtual session; and when there is no VM instance of the plurality of VM instances designated to service virtual sessions whose average time to finish matches the average time to finish for the fourth virtual session and there is no VM instance of the plurality of VM instances that has available capacity to service the fourth virtual session:

provision a new VM instance; and execute the fourth virtual session on the new VM instance.

14. The system of claim 13, wherein the new VM instance services virtual sessions having an average time to finish matching the average time to finish of the fourth virtual session.

15. The system of claim 13, wherein provisioning the group of VM instances having the largest average time to finish is based on a number of third virtual sessions that are expected within a next average time to finish for the second virtual session.

16. The system of claim 13, wherein provisioning the group of VM instances having the largest average time to finish is based on historical virtual session data.

17. The system of claim 13, wherein the one or more processors are further configured to, when the provisioned group of VM instances does not have available capacity to service the number of third virtual sessions that are expected and the second virtual session:

provision a new VM instance; and execute the second virtual session on the new VM instance.

18. A non-transitory computer-readable medium storing program instructions that are executable by a computing device to:

receive a first request to execute a first virtual session in a cloud computing environment;

provision, based on the first request, a virtual machine (VM) instance of a plurality of VM instances designated to service virtual sessions whose average time to finish matches an average time to finish for the first virtual session;

execute the first virtual session on the VM instance when the VM instance has available capacity to service the first virtual session;

receive a second request to execute a second virtual session in the cloud computing environment; and based on the second request and when there is no VM instance of the plurality of VM instances designated to service virtual sessions whose average time to finish matches the average time to finish for the second virtual session:

provision a group of VM instances having a largest average time to finish to minimize VM fragmentation when a number of third virtual sessions that are expected to be executed fall within the average time to finish for the second virtual session, wherein the provisioned group of VM instances is one of a plurality of groups of VM instances that has available capacity to service the second virtual session, and each group of VM instances, in the plurality of groups, have a same average time to finish; and execute the second virtual session on one VM instance in the provisioned group of VM instances when the provisioned group of VM instances has available capacity to service the number of third virtual sessions and the second virtual session.

19. The non-transitory computer-readable medium of claim 18, wherein the program instructions are further executable to:

receive a third request to execute a second virtual session in the cloud computing environment;

provision, based on the third request, a VM instance that is designated to service virtual sessions whose average time to finish matches an average time to finish for the second virtual session; and when there is no VM instance of the plurality of VM instances designated to service virtual sessions whose average time to finish matches the average time to finish for the second virtual session and there is no VM instance of the plurality of VM instances that has available capacity to service the second virtual session:

provision a new VM instance; and execute the second virtual session on the new VM instance.

20. The non-transitory computer-readable medium of claim 19, wherein the program instructions are further executable to, when the provisioned group of VM instances does not have available capacity to service the number of third virtual sessions that are expected and the second virtual session:

provision a new VM instance; and execute the second virtual session on the new VM instance.

* * * * *